United States Patent
Plamondon

(10) Patent No.: US 8,812,911 B2
(45) Date of Patent: Aug. 19, 2014

(54) DISTRIBUTED TESTING OF A SOFTWARE PLATFORM

(75) Inventor: James Lee Plamondon, Austin, TX (US)

(73) Assignee: Rackspace US, Inc., San Antonio, TX (US)

( * ) Notice: Subject to any disclaimer, the term of this patent is extended or adjusted under 35 U.S.C. 154(b) by 328 days.

(21) Appl. No.: 13/422,243

(22) Filed: Mar. 16, 2012

(65) Prior Publication Data

US 2013/0246849 A1 Sep. 19, 2013

(51) Int. Cl.
*G06F 11/36* (2006.01)

(52) U.S. Cl.
CPC ........ *G06F 11/3668* (2013.01); *G06F 11/3688* (2013.01)
USPC ....................................... 714/38.14; 714/38.1

(58) Field of Classification Search
CPC ............ G06F 11/0709; G06F 11/3668; G06F 11/3688
USPC .............................................. 714/38.1, 38.14
See application file for complete search history.

(56) References Cited

U.S. PATENT DOCUMENTS

| | | | |
|---|---|---|---|
| 2003/0005200 A1* | 1/2003 | Kumar et al. | 710/302 |
| 2007/0214391 A1* | 9/2007 | Castro et al. | 714/38 |
| 2008/0189697 A1* | 8/2008 | Kachroo et al. | 717/171 |
| 2008/0229284 A1* | 9/2008 | Castro et al. | 717/124 |
| 2011/0231832 A1* | 9/2011 | Dorn et al. | 717/170 |
| 2011/0314389 A1* | 12/2011 | Meredith et al. | 715/751 |
| 2013/0179399 A1* | 7/2013 | Weissenberger et al. | 707/627 |
| 2013/0185564 A1* | 7/2013 | Jaber et al. | 713/176 |

OTHER PUBLICATIONS

SHIVASOFT, the supreme solution, http://shivasoft.in/blog/salesforce/step-by-step-salesforce-tutorial---creating-trigger-and-test-cases---6-of-6, "Step by step Salesforce Tutorial—Creating Trigger and Test cases—6 of 6," Oct. 11, 2010, 11 pages.
Understanding Testing in Apex, http://www.salesforce.com/us/developer/docs/apexcode/index_Left. htm#StartTopic=Content/apex_testing.htm, "Testing Apex," copyright 2000-2012 salesforce.com, Inc., 21 pages total.

* cited by examiner

*Primary Examiner* — Chae Ko
(74) *Attorney, Agent, or Firm* — Trop, Pruner & Hu, P.C.

(57) ABSTRACT

A system includes a platform server with a software platform on which platform targeting applications (PTAs) execute. An update server may be coupled to the platform server to provide an update to this software platform. Responsive to notification to independent software vendors of the PTAs, results of regression testing performed on at least some of the PTAs can be received in a test server, which may enable commitment of the update based on at least some of the results.

20 Claims, 6 Drawing Sheets

DISTRIBUTED TESTING OF A SOFTWARE PLATFORM

BACKGROUND

Various types of software have been developed to execute on the many different types of computer systems that are available. These different types of software range from operating systems (OS), firmware, and other low level applications, to application programs. Moreover, certain software can be classified as a software platform, in that other software can execute on this platform software. While one example of a software platform may be an OS, other examples can be any type of platform such as a cloud computing platform on which application software executes.

A software application that depends, for its proper operation, on the services of an underlying platform, can be said to "target" that platform. A given platform, and all of the applications that target it, can be called a "platform ecosystem." The services of the platform are exposed to the ecosystem's applications through an Application Programming Interface, abbreviated API (which may take many forms, such as a software library, a SOAP interface, an RESTful interface, etc.). An application that targets a given platform can be called a "Platform-Targeting Application", abbreviated PTA. The independent entities that develop PTAs can be called the platform's "Independent Software Vendors," abbreviated ISVs.

By way of example, the Netflix application (of which Netflix Inc is the ISV) is a well-known PTA. Versions of the Netflix client target a variety of platforms, while the Netflix application's server-side implementation targets the Amazon Web Services cloud computing platform.

Under the methodology known as "continuous integration," whenever a software product's implementation is changed, the changed product is subjected to a suite of rigorous automated tests defined by the product's developer. One kind of testing, called "regression testing," tests the changed software product to see if the new changes break existing functionality. For applications, such testing by the product's developer, called "internal" testing, is sufficient to find product bugs. However, changed platforms require additional testing—of both its implementation and of its API—to ensure that the change does not break applications that target the ecosystem. If a bug in a platform keeps the platform itself from working, then it is a product bug. If, however, it does not keep the platform from working, but breaks one or more of its PTAs, then it can be called an "ecosystem bug."

The traditional approach to finding ecosystem bugs is "beta testing." In beta testing, once a new version of a platform—incorporating many changes—has passed all (or most) of its own test suite, it is made available to the platform's ISVs. ISVs can use the beta version of the changed platform to test their PTAs, to see if any of its many changes break their PTAs.

There are three main problems with the beta testing process, as historically implemented in the computer software industry. First, it waits to test many changes at once, at the very end of the development process. This is inefficient, because if a bug is found when it is first written, it tends to be easy to fix, whereas if undetected, additional code may be layered over the unfound bug, making it much more difficult to find and fix later. Second, it tests a multitude of changes simultaneously, which means that many different bugs may interact in complex, hard-to-identify, and even harder-to-fix ways. Third, it places a large source of schedule risk at the very end of the development process, when the greatest amount of schedule certainty is needed (to coordinate sales and marketing campaigns around the new version of the platform).

SUMMARY OF THE INVENTION

According to one aspect, the present invention includes a method for performing distributed testing of an update to a software platform. This method includes sending an update notification from a notification server of a software provider to independent software vendors (ISVs) each associated with at least one platform targeting application (PTA) that executes on the software platform. This update notification may be used to indicate occurrence of an update to the software platform and to trigger execution of regression testing by the ISVs of their PTAs.

In turn, a provider of the software platform may receive a result of the regression testing and update, via a test server, a first count for each of the ISVs providing a result indication of successful regression testing and update a second count for each of the ISVs providing a result indication of unsuccessful regression testing. The update can be committed to the software platform if the first count exceeds a first threshold. If instead the first count does not exceed the first threshold, the update is not committed.

As one example, the software platform may be a cloud computing platform, where the ISVs are unaffiliated software providers for the platform, and code of the regression testing of these ISVs remains private to the ISVs.

Another aspect is directed to a system that includes a platform server having a software platform on which PTAs execute. An update server may be coupled to the platform server to provide an update to the software platform. Also a notification server may be configured to send an update notification to inform the ISVs of an update to the software platform. Still further, a test server may be configured to receive a result of regression testing performed on at least some of the PTAs and to commit the update to the software platform based on at least some of the results.

Yet another aspect of the present invention is directed to an article such as a non-transitory computer-readable storage medium that including instructions to enable a system to perform distributed regression testing of a software platform. Specifically, these instructions can enable a system to send an update notification to ISVs associated with PTAs that execute on a cloud computing platform of a data center. This update notification indicates occurrence of an update to the cloud computing platform and triggers execution of regression testing by the ISVs. In addition, the instructions enable the system to receive a result of the regression testing from at least some of the ISVs and commit the update to the software platform if at least certain PTAs pass the regression testing.

DETAILED DESCRIPTION

Figure 1:
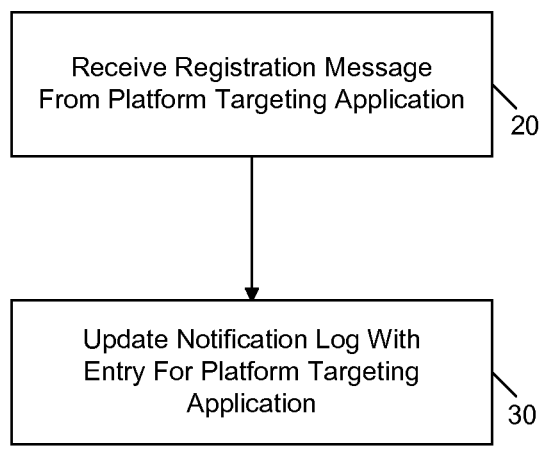
FIG. 1 is a flow diagram of a method for performing registration of Platform Targeting Applications (PTAs) in accordance with an embodiment of the present invention.

The goal of the present invention, in various embodiments, is to incorporate "beta testing" into the continuous integration process, such that it is performed frequently and early for small collections of changes, rather than rarely and late for large collections of changes. More specifically, embodiments enable ISVs of applications that target a particular platform: (a) to register to be notified when that platform changes; (b) to run their PTA's test suite upon receiving such a Platform-Change Notification (abbreviated PCN); and (c) to send the results of running that test suite—in more or less detail—as a Platform Change Notification Response (abbreviated PCN-Response). By emitting a platform-change notification for each individual change to its platform (or for small collections of changes), the three problems associated with beta-testing, listed above, are addressed:

1) Because ecosystem bugs are found and fixed early, the risk of layering additional code atop unfound bugs is reduced, thereby reducing the amount of code that needs to change for each ecosystem bug, on average, vs. traditional beta testing.

2) Because a PCN is emitted for each individual change (or small set of changes), the risk of complex interactions among change-induced bugs is relatively small, vs. traditional beta testing.

3) Because ecosystem bugs are found incrementally across the entire development process, the risk of suffering ecosystem-bug-driven delays right at the end of the development process is dramatically reduced, v. traditional beta testing.

Let us compare and contrast the conventional platform development cycle and that enabled by embodiments of the present invention.

In a conventional platform development cycle, a so-called alpha testing release occurs when all of the major changes to a given platform are "feature complete," typically to a small group of ISVs and generally under privacy provisions according to nondisclosure agreements. The purpose of the alpha release is two-fold: firstly, to enable ISVs to start taking advantage of the platform's newly-added features in their PTAs, and secondly, to enable the platform developer to get detailed feedback from those ISVs regarding the design and implementation of the platform's new features. In a next development phase of a conventional development cycle, a beta testing release occurs in which the platform, typically having been revised according to the testing by the platform vendor as well as ISV feedback from the alpha release evaluators, is opened up to a larger group with features and functionality closer to a final version. Again the purpose is two-fold: enablement of the ISVs to update their PTAs to take advantage of the platform's new features, and feedback to the platform developer regarding ecosystem bugs. Upon successful testing of this beta release, both by the platform vendor as well as ISVs, a final phase occurs, namely a final release in which the software platform is publicly launched and made available to all users. While it is anticipated in most cases that various updates to the code after the final release will occur, in general the software platform works for all intended purposes at this point of final release.

In contrast, embodiments of the present invention may eliminate the alpha testing phase and beta testing phases, as such, from the overall platform development cycle, by integrating ecosystem testing into the continuous integration process. Instead of having a large beta testing phase at the end of platform development, innumerable tiny beta testing phases can occur in between the platform developer's issuance of a PCN and the completion of its processing of the PCN-Response messages it receives in return.

By enabling rapid, targeted feedback from ISVs on small incremental changes, throughout the platform development process, embodiments may decrease the cost of such small changes (relative to the cost of traditional beta testing). This reduction in cost has the potential to accelerate the rate at which software platforms—and their ecosystems—evolve.

Embodiments of the present invention enable the development cycle to operate in a generally continuous integration manner, in which updates can be made continuously to the software platform. Then according to the registration and notification process described herein, PTAs, upon receipt of a PCN, can perform internal regression testing to determine suitability of the updated code for that application, and issue a PCN-Response back to the platform developer. Based on feedback from this distributed testing, updates to a software platform can occur more often and more rapidly, and oftentimes in a wholly automated manner.

Accordingly, by enabling federated evaluation of software platform revisions, code modifications on either side of a message interface that is used to communicate between the software platform vendor and ISVs can occur. In other words, the software platform and the PTAs are loosely coupled across a message interface, which can be standardized in various embodiments. Such loose coupling enables the pace of innovation on either side of this message interface to occur at different speeds. For example, many more updates to the software platform can occur, enabling greater functionality features and improvements of the code, while PTAs (for example) remains relatively static, or vice versa. And, via the federated testing realized as described herein, it can be ensured that the updated software platform is suitable for execution of ISVs' PTAs.

Different mechanisms can be used to trigger distributed testing in accordance with an embodiment of the present invention. However, in many implementations the testing can be realized by providing a registration mechanism to enable ISVs to register one or more applications as targeting the given platform. This registration mechanism thus results in a list of PTAs that are to be notified upon a change to the software platform. Although described in this implementation as a registration process, other manners of identifying PTAs for performing distributed testing in accordance with an embodiment of the present invention can be realized. For example, rather than using a "push" model of change notification, a "pull" model of change identification could be used. In a "pull" model, each change to the underlying platform's code repository would be given a unique identifier (Change ID, abbreviated CID). PTAs would monitor the platform's code repository and run their automated tests suites when the repository changed. Any ecosystem bugs encountered as a result of the change could be lodged with the platform developer's bug tracking system using the CID as a flag, to indicate that they were ecosystem bugs associated with that particular change. The "pull" model is less orchestrated than the "push" model, giving both the platform developer and the ISV less control over the process.

Referring now to FIG. 1, shown is a flow diagram of a method for performing registration of PTAs in accordance with an embodiment of the present invention. As shown in FIG. 1, method 10 may begin by receiving a registration message from a PTA (block 20). In one embodiment, the registration message may take the form of a fillable web page including various identification information for the PTA and its ISV. Note that a given ISV may have multiple PTAs for use with a given software platform and accordingly, multiple fillable pages can be completed by the ISV. In general, the information provided by way of this fillable form can include identification information such as a destination location for sending the notification of updates, identification of the ISV and PTA, among other information such as the type of interfacing used between the application and software platform, name and contact information of a contact person at the PTA's ISV, and so forth.

Responsive to this registration message, a notification log can be updated with an entry for this PTA (block 30). Various manners of indicating to ISVs that changes to the software platform are available for analysis in this distributed testing environment may be realized. For example, these changes can be indicated by publishing a PubSub message via RSS, ATOM, or PubSubHubbub.

As to the notification log, this log may be maintained by the software platform vendor and can be implemented as a database including multiple entries, each associated with a given PTA. Then when an update is made to the software platform, the notification log can be accessed and used to send an indication of the update to the registered PTAs to enable distributed testing to occur. Although shown at this high level in the embodiment of FIG. 1, understand the scope of the present invention is not limited in this regard.

Figure 2:
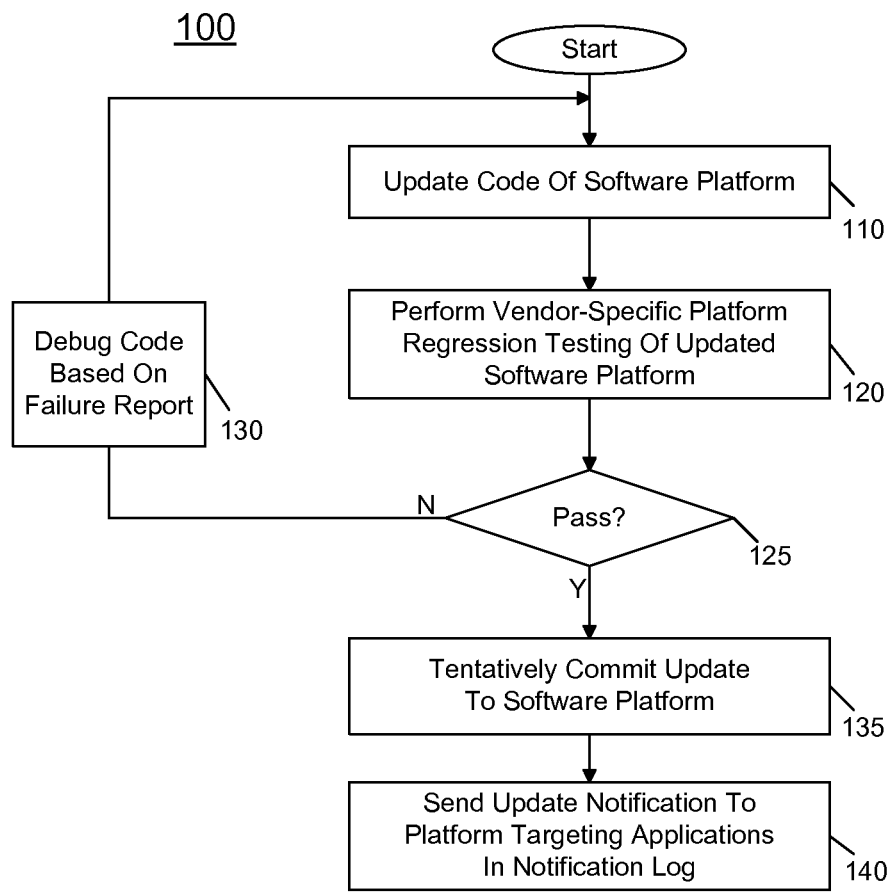
FIG. 2 is a flow diagram of a high level method for performing software platform updates and notifications in accordance with an embodiment of the present invention.

Referring now to FIG. 2, shown is a flow diagram of a high level method for performing software platform updates and notifications in accordance with an embodiment of the present invention. As seen, method 100 can begin by updating code of the software platform (block 110). Note that such code updates can take many different forms, from a minimal change for a bug fix, to an incremental change to a given function of the code, to introduction of a new feature, to a major revision to the code. Such code updates can be performed in well-known manners and generally may include any change(s) encapsulated in a single "commit" (in the parlance of continuous integration).

Before changing the software platform with this update to the code, control next passes to block 120 where the platform vendor runs its internal regression tests to discover if, and how, the change to the underlying platform breaks the platform's existing functionality. This "platform regression testing" may be designed by the software vendor itself based on its internal knowledge of the software platform, its interfaces and so forth. In some embodiments, the platform regression testing may also include use of an open source-based regression test suite.

Still referring to FIG. 2, next it can be determined whether the regressing testing of the updated software platform passes platform regression testing (diamond 125). If not, control passes to block 130 where the code can be debugged based on one or more failure reports obtained from the platform regression testing and control passes back to block 110. If instead the code passes the platform regression testing, control passes to block 135 where the update can be tentatively committed to the software platform.

As further seen in FIG. 2, control passes to block 140 where an update notification can be sent to the registered PTAs. That is, as discussed above a notification log can include multiple entries each associated with a given PTA that executes on the software platform. By way of these notifications, the PTAs may then trigger their own individual (and potentially proprietary) regression testing of their own PTAs against the updated software platform.

Responsive to this notification sent to the ISVs, distributed testing (also called "ISV regression testing," to distinguish it from "platform regression testing") of the software platform update can occur. Because this testing is done by the ISVs themselves and in a manner that is hidden from the software platform vendor, the regression testing of the ISVs remains confidential and proprietary as in many implementations no identifying information such as source code or other code-identifying information is provided back to the software vendor. Instead as will be discussed below, basic information such as results of the regression testing (e.g., pass or fail) and potentially certain failure log information may be provided. However, the regression testing performed by the ISVs remains confidential. And, by opening up the testing in this distributed manner, greater analysis of the updated software platform occurs, making it more robust.

Figure 3:
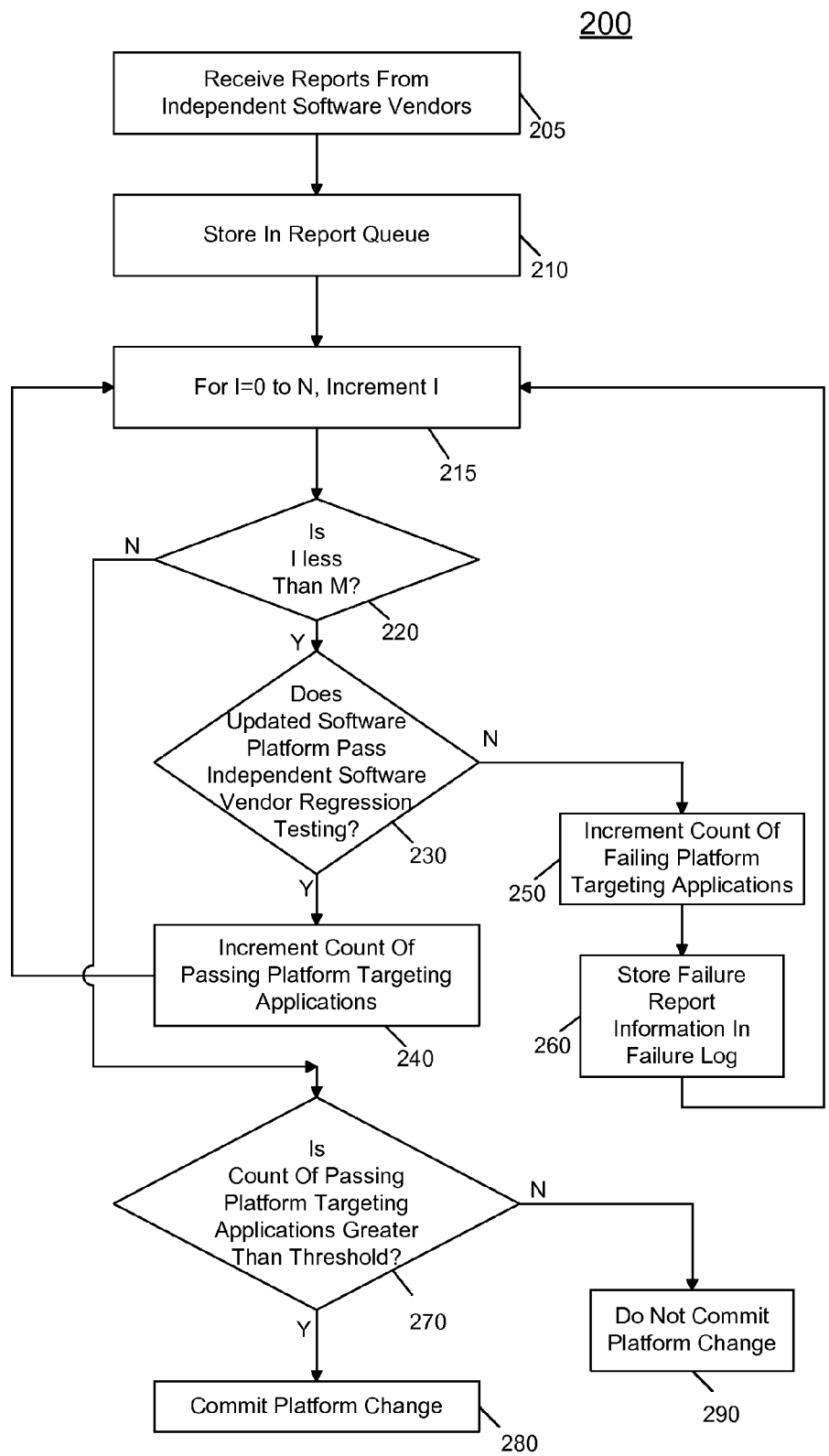
FIG. 3 is a flow diagram of a method for handling regression testing results from distributed ISV testing of a software platform in accordance with one embodiment of the present invention.

Referring now to FIG. 3, shown is a flow diagram of a method for handling regression testing results from distributed ISV testing of a software platform in accordance with one embodiment of the present invention. Note that the embodiment shown in FIG. 3 is at a relatively high level and comprehends a platform update process in which a decision whether to commit a given update to the software platform is based on a raw number of PTAs that pass their own internal regression testing on the updated software platform. However, in many systems employing a software platform, there is a wide variety of PTAs that execute on the software platform. In general, some of these applications may be of utmost relative importance, e.g., owing to the amount of traffic driven by these applications, the amount of revenues realized by the software platform vendor or so forth. In contrast, many other of the PTAs may be of a lesser priority, e.g., owing to their reduced amount of traffic, revenue or so forth. Accordingly in other implementations it may be possible to determine suitability of the update to the software platform based on different testing models, as will be described further below.

As seen in FIG. 3, method 200 may begin by receiving reports from ISVs having applications that execute in connection with the software platform (block 205). Note that these reports can be in a predefined format in which relatively limited information is provided to maintain the privacy of the ISV regression testing operations. For example, in one embodiment the reports can be as simple as including an identification of the customer (and possibly the given PTA) and at the least, pass/fail information, which can be in the form of a Boolean value, e.g., a single true/false value, logic high logic/low value or other such indication. In other embodiments, greater amounts of information can be provided, particularly in the instance of a failure of the application on the updated software platform code. To enable greater automation of such platform testing, some type of predefined message format for providing testing results may be used. In one embodiment, a HTTP-based or MIME-based message format can be used to provide information including the above-described identification information, pass/fail information, and if a failure is indicated, at least certain details regarding the failure.

Although the scope of the present invention is not limited in this regard, details regarding the failure can indicate a location in the updated code at which the failure occurs, a type of failure that occurred, as well as other details regarding the failure. Note that the ISV regression testing that occurs can test for various categories of failure including, for example, functionality failures, e.g., where the updated software platform breaks the application, a performance failure where the functionality of the PTA still works albeit at a lower performance level (e.g., slower, less functionality or so forth), or a user experience failure such that certain features or functionality is not available, at least for some users (e.g., to users having different language requirements). Thus in some embodiments the message interface provides for a predetermined data format to provide information regarding standard error categories or types, different formats such as with regard to quality of service (QoS) formats or so forth. Accordingly, in these implementations the output of an ISV testing suite can be an input into a message manager, accessible to the ISV to populate this predetermined message format for transmission to the software platform vendor.

Still referring to FIG. 3 at block 210, the incoming reports can be held in a report queue, which may be located in the same storage system as the notification database (or in another location). For each incoming report, various operations can be performed. Note that in various embodiments a selected amount of waiting time can occur after performing a notification before analyzing incoming results, to enable as large a population of results as possible to be received and analyzed. As seen, at block 215 a loop can begin for a number of incoming reports (e.g., zero to N where N may be the number of PTAs registered in the notification log) to perform analysis of the reports for each incoming report. Note that it is possible in many instances that not all of the notified ISVs either undertake regression testing on each and every software platform update or provide results of such testing if done.

Accordingly, embodiments may provide for processing a flexible level of entries in the report queue. Thus in the embodiment of FIG. 3, control passes to diamond 220 where it can be determined whether a suitable number of requests have been processed. In one embodiment this number may be M, which may be a number smaller than N (and in many instances can be much smaller than N).

As seen in FIG. 3, at diamond 230 it can be determined whether the updated software platform passes a given ISV regression test suite. In one embodiment, this determination can be based on a simple Boolean value of the report from a given ISV that indicates successful passing of the regression testing. If successful testing is indicated, control passes to block 240 where a count of passing PTAs can be incremented. Otherwise if the PTA under analysis fails its regression testing, control passes to block 250 where a count of failing PTAs can be incremented. In addition note that for a failing report, failure report information from the report can be stored in a failure log (block 260). Understand that such information can take many different forms. This information can be analyzed, both automatically and by developers of the software platform to enable revisions to the code updates to potentially overcome the regression testing failures.

Thus the analysis (e.g., pass/fail analysis) can be performed for a desired number of reports received. Still referring to FIG. 3, if a suitable number of reports have been received, control next passes to diamond 270. Thus as determined at diamond 220, if the analyzed reports meets a threshold M (which may be less than the total number of PTAs registered for notifications, N) control passes to diamond 270. There, it can be determined whether the count of PTAs passing their respective regression testing is greater than a threshold. Although the scope of the present invention is not limited in this regard, in one embodiment this threshold may be set at a relatively high threshold, e.g., at least 99% such that the update to the platform code enables the vast majority of PTAs that reported results to operate properly.

Thus if this threshold is met, control passes to block 280 where the platform change can be committed. Although the scope of the present invention is not limited in this regard, in one embodiment such commitment may include exposing the updated platform as the current version on the Internet. Otherwise, if this threshold is not met, control passes to block 290 where the platform change is not committed. Although shown at this high level in the embodiment of FIG. 3, understand the scope of the present invention is not limited in this regard. For example as discussed above, many different possibilities may exist as to the determination of whether a given update should be committed. More particularly, this determination can take into consideration priorities of different PTAs, total number of PTAs passing and/or failing among other such information as will be described further below.

Thus although FIG. 3 shows an implementation in which a raw number of PTAs provide a passing indication for the updated software platform, other embodiments may provide different weightings based on different classifications of the PTAs themselves. For example, in the context of a software platform for cloud-based computing, e.g., provided by a data center, embodiments may instead weight higher in the analysis certain PTAs based on various criteria. These criteria may include, for example, revenue by PTA, traffic driven by the application, or any other such metric or combination of metrics.

Figure 4:
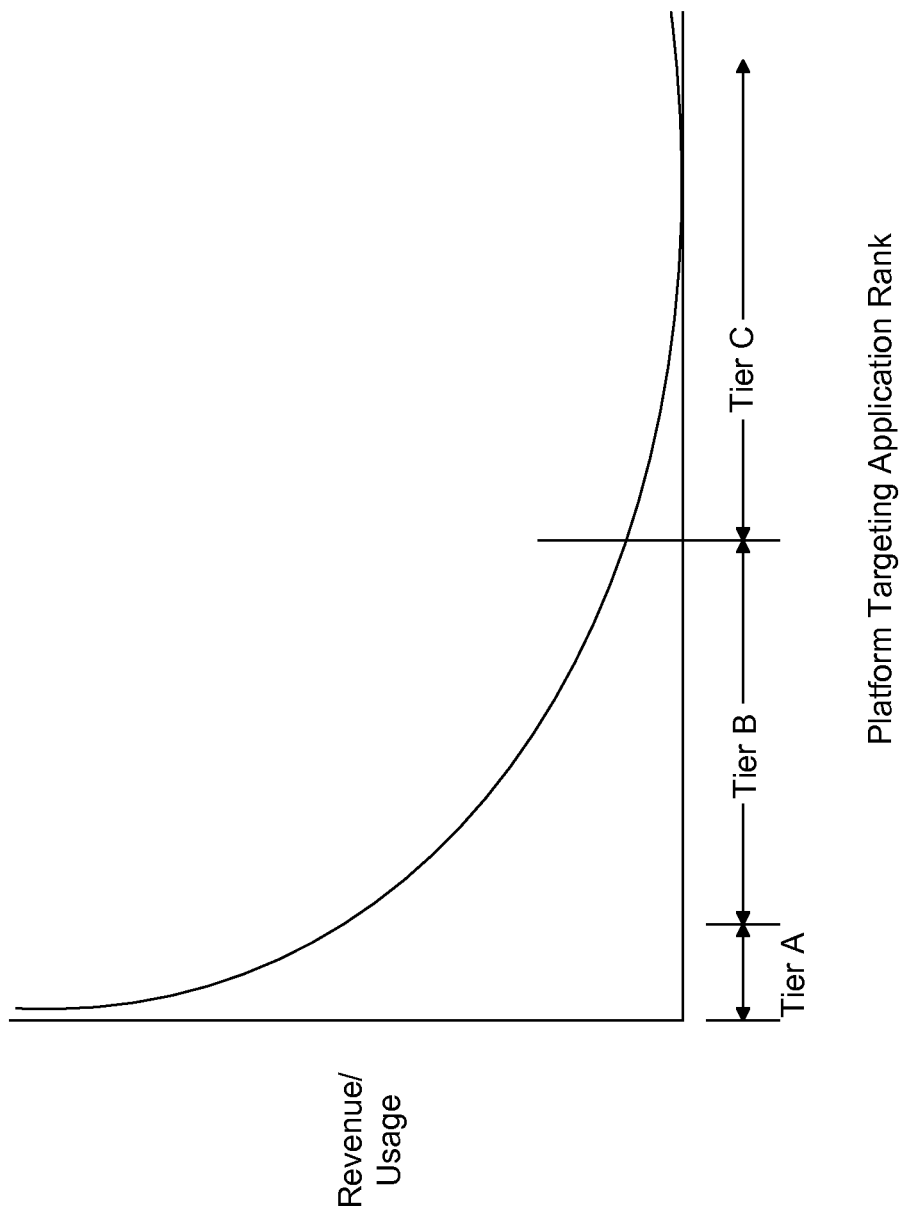
FIG. 4 is a graphical illustration of a power law with regard to criticality of PTAs in accordance with one embodiment of the present invention.

As an example, reference can be made to FIG. 4, which is a graphical illustration of a Zipf's law or power law with regard to criticality of PTAs. In the example shown, these PTAs can be subdivided into multiple levels or tiers of criticality. In the particular example shown, three such tiers are present. The first tier applications, which may be a very small number of applications (e.g., less than 100 in some embodiments) may drive the highest amount of revenues and/or usage of the software platform and accordingly are the most significant applications from the point of view of the software platform vendor. According to a power law, next is a second tier of PTAs, which may correspond to a larger number of applications (e.g., between approximately 40% and 50% in some embodiments). As seen, these second tier applications may have lower levels of revenue/usage than the first tier applications. And similarly, the third tier applications have even lower levels of revenue/usage and can correspond to, e.g., the lowest 50% of the PTAs.

With regard to software platform updates and the distributed testing realized according to embodiments of the present invention, a different analysis can occur such that a hybrid approach is used where differing thresholds of passing PTAs are analyzed for the different tiers of applications. As one such example, an update to the software platform may not be committed if regression testing performed by any of the first tier applications fails. Similarly, if a threshold number of second tier applications indicate failure with regard to the updated software platform, the update is not committed. And still further for the third tier of applications, yet another (e.g., higher) threshold of failures would need to occur before choosing to not commit an update. Of course while shown in FIG. 4 with three tiers and the relative number of applications in these tiers and corresponding revenue/usage, understand that this illustration is exemplary only and additional or different levels of tiers may be present in other embodiments.

Figure 5:
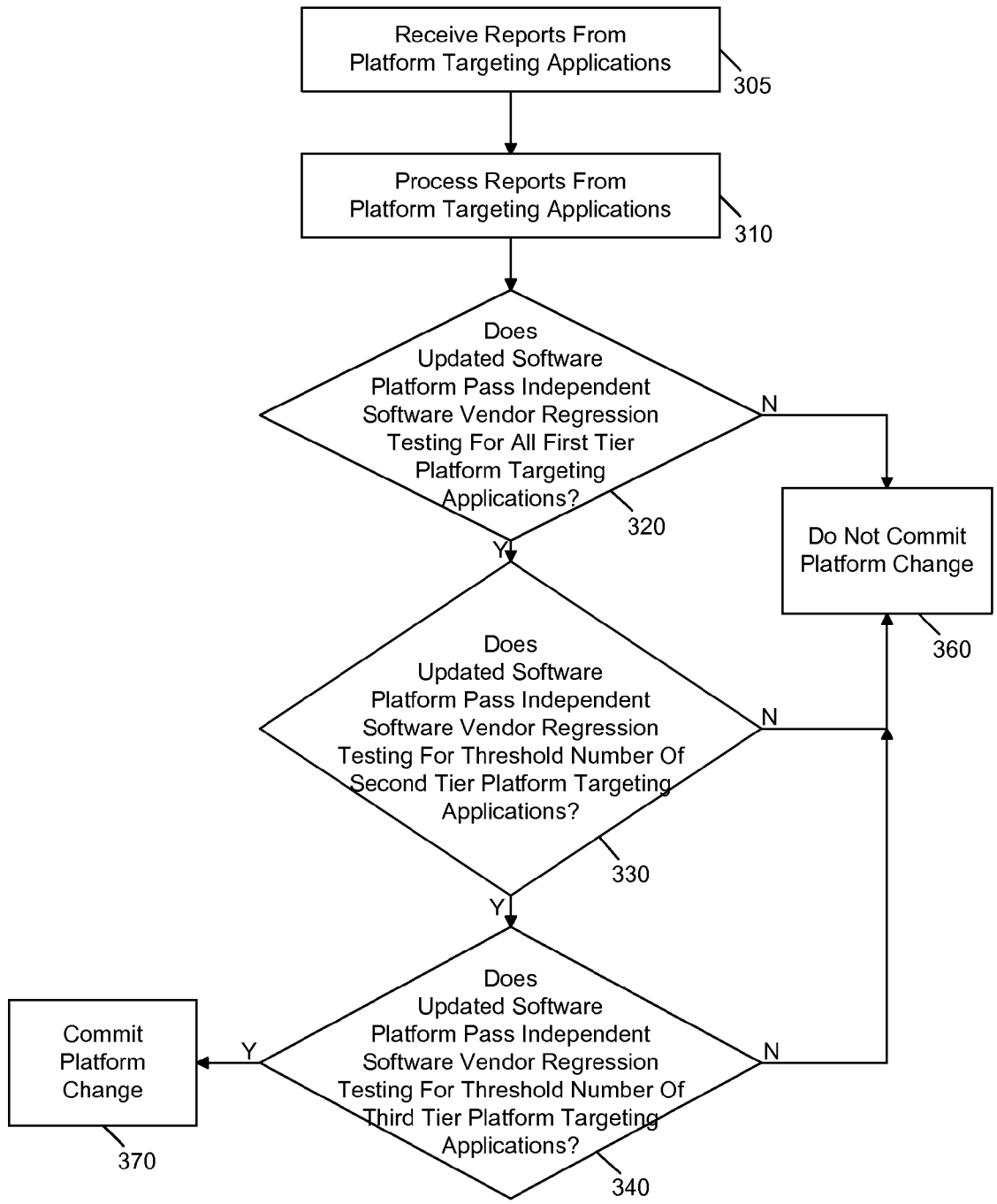
FIG. 5 is a flow diagram of a method for handling regression testing results from distributed ISV testing of a software platform in accordance with another embodiment of the present invention.

Referring now to FIG. 5, shown is a flow diagram of a method for handling regression testing results from distributed ISV testing of a software platform in accordance with one embodiment of the present invention. Note that FIG. 5 is with regard to a hybrid commitment analysis. As seen in FIG. 5, method 300 may begin by receiving reports from PTAs (block 305). As described above, these reports can be in a predefined format. These reports can be processed at block 310, e.g., as described above. Here however, different counts can be maintained for the different tiers of applications. For example, in a three tier system, a count can be maintained of passing and failing applications for each of the tiers.

In the hybrid approach of FIG. 5, control next passes to diamond 320 to determine whether the updated software platform passes the ISV regression testing for all first tier PTAs. If not, control passes directly to block 360 where the platform change is not committed. This is so, as due to the relative importance or criticality of the first tier PTAs, a change that breaks an application should not be allowed. Note that in some embodiments, if all of the first tier PTAs do not provide results of their regression testing, a change is not committed. Nevertheless in other embodiments, in the absence of ISV regression testing results for a tier one application, platform changes can still be committed.

If instead at diamond 320 it is determined that the updated software platform passes ISV regression testing for all first tier PTAs, control passes to diamond 330 where it can be determined whether the updated software platform passes ISV regression testing for a threshold number of the second tier PTAs. Note that this threshold number may be set at a relatively high level for this second tier of applications. As examples, in some embodiments the threshold level may be between approximately 80%-90%. Accordingly, if it is determined that this threshold level of regression testing pass results is not achieved for this second tier of PTAs, control passes also to block 360 where the platform change is not committed.

Still referring to FIG. 5, next if it is determined that the updated software platform passes the threshold level of regression tests for the second tier applications, control passes to diamond 340, where it can be determined whether the updated software platform passes regression testing for a threshold number of the third tier PTAs. Note that this threshold number may be set at a relatively lower level for this third tier of applications. For example, in some embodiments this lower level threshold can be on the order of 40%-60%. If this threshold for the third tier of applications is not met, control again passes to block 360 where the platform change is not committed. Otherwise control passes to block 370, where the platform change is committed. Although shown at this high level in the embodiment of FIG. 5, understand the scope of the present invention is not limited in this regard. For example, additional tiers may be present, and different weightings can be given to different applications on a basis other than tiers. For example, a total number of passing regression test results, weighted by criticality of application can be met before allowing a platform change to commit. Further, it is possible that a change may be committed solely based on analysis of a subset of the tiers. As one example, it may be sufficient if the updated software platform passes regression tests for the first tier applications (or as another example, a combination of first and second tier applications).

Figure 6:
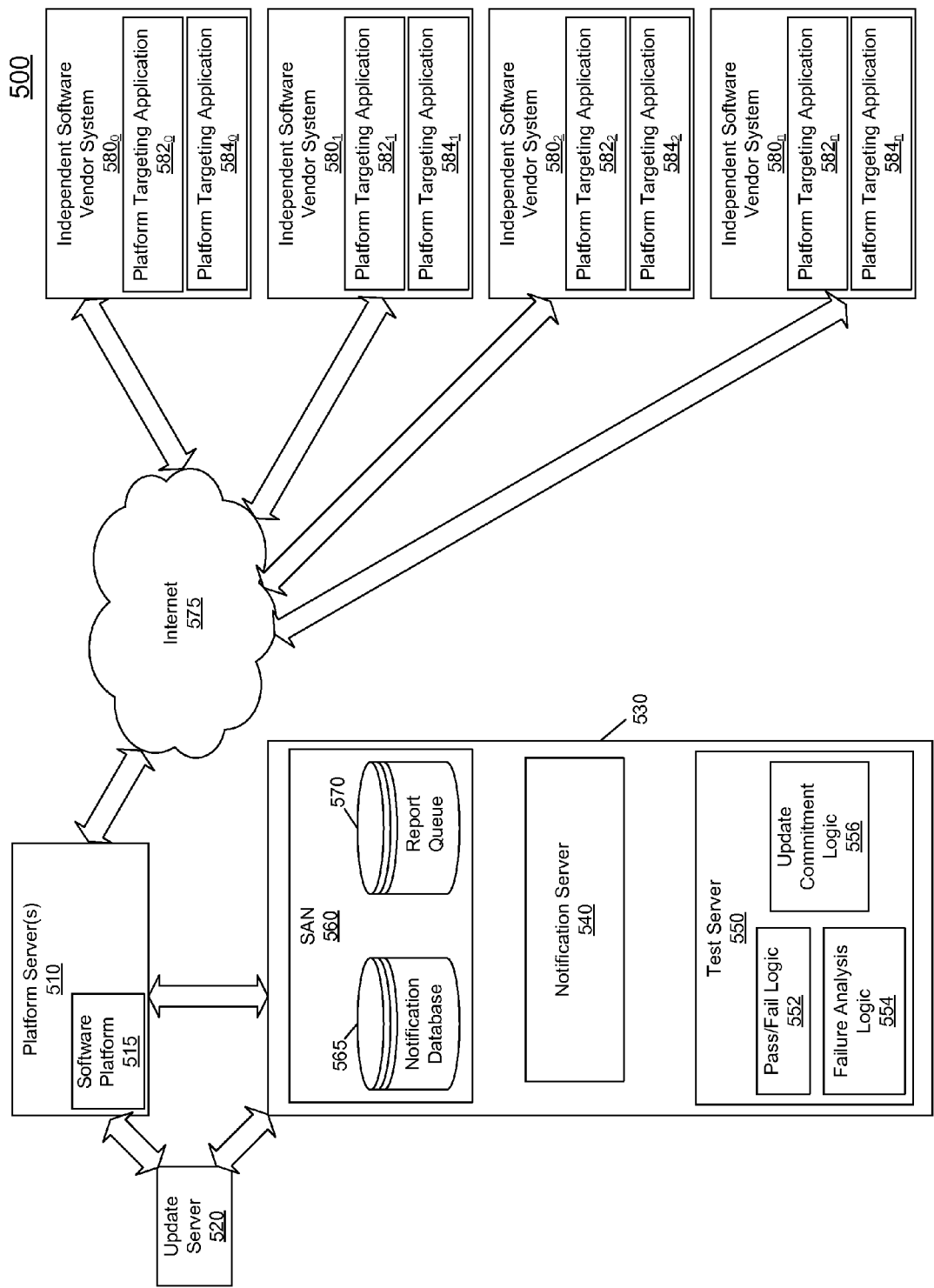
FIG. 6 is a block diagram of a system in accordance with an embodiment of the present invention.

Referring now to FIG. 6, shown is a block diagram of a system in accordance with an embodiment of the present invention. As shown in FIG. 6, system 500 shows at a high level interconnection between one or more platform servers 510, e.g., of a multi-tenant data center and systems of multiple ISVs, namely ISV systems $580_0$-$580_n$, which can be various computer systems such as servers, client systems such as desktop computers, notebook computers, tablet computers, personal computers, smartphones or so forth, coupled to platform server 510 via a network such as Internet 575.

In general, each ISV system includes various hardware including one or more CPUs, memory, storage, user interfaces and so forth. In addition, each system may include one or more PTAs, e.g., PTAs $582_0$-$584_0$. In some embodiments, these PTAs may be user-selected applications to request a particular service such as a cloud-based service, e.g., the accessing of content via the web or a media delivery system, the electronic management of financial information or so forth.

With regard to platform server 510, it may include one or more software platforms 515, which as discussed above in one embodiment can be a cloud-based platform. In this way, platform servers 510 can provide cloud-based services to the ISVs. Although the scope of the present invention is not limited in this regard, such cloud services can be computing resources, storage resources, or web services among many others. Note that for ease of illustration although only a single server is shown, which as discussed above may generally include one or more CPUs, memory, storage devices, input/output devices and so forth, understand that in many implementations a large number of servers to provide platform services can be present. For example, a data center can include a large number of cabinets each including many rack-mounted servers. These servers within the cabinets can include systems dedicated to a given client of the multi-tenant data center, while other resources may be so-called cloud resources that can be flexibly assigned to different clients, e.g., depending on demand.

Still referring to FIG. 6, an update server 520 may be coupled to platform server 510. In various embodiments, update server 520 may be used to provide updated software to the software platform present in the platform server. As described, such updates can be of a wide variety, ranging from small bug fixes to major code revisions.

As further seen in FIG. 6, an additional cabinet 530 may include multiple servers and a storage area network (SAN) 560. As seen, SAN 560 may include, in one embodiment a notification database 565 which as discussed above may include multiple entries each associated with a given PTA to provide information as to where to send a notification on an update to the software platform. In addition, a report queue 570 may also be present within SAN 560. Report queue 570 may store incoming result reports received from various ISVs regarding regression testing performed on updated platform by the ISVs software.

To enable notifications to be sent, a notification server 540 may be present within cabinet 530 that, upon triggering by an update from update server 520 will cause a notification to be sent to the various ISVs having associated entries in notification database 565.

Still further in accordance with an embodiment of the present invention, a test server 550 may be present. Test server 550 may be used to analyze the result of regression testing, both performed internally to the data center as well as to receive and to process incoming results of regression testing performed by ISVs. As seen in the embodiment shown in FIG. 6, test server 550 may include pass/fail logic 552 which may implement one or more algorithms such as described above to tally the counts of passing/failing applications with regard to a given update. Note that metrics for multiple updates may be maintained as it is possible, in some embodiments, that multiple updates are tentatively committed prior to determination whether to finally commit such updates.

In addition, a failure analysis logic 554 may be present, which can be used to analyze information in received reports to determine a root cause of a failure and to communicate that information, e.g., to update server 520 to aid in the design of the code. Still further, an update commitment logic 556 may be present and can be used to determine whether a given update to the software platform is suitable for commitment and to commit the update to software platform 515 when approved according to the commitment methods described above. Although shown at this high level in FIG. 6, understand the scope of the present invention is not limited in this regard. For example, understand that the different servers and SAN present in cabinet 530 could be distributed across multiple cabinets, e.g., connected by an aggregation layer or higher level data center interconnection. Also understand that additional data center components such as routers, switches, firewalls, load balancers and so forth are not shown for ease of illustration.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
sending an update notification from a notification server of a software provider to a plurality of independent software vendors (ISVs) each associated with at least one platform targeting application (PTA) to execute on a software platform of the software provider, the update notification to indicate occurrence of an update to the software platform and to trigger execution of regression testing by the plurality of ISVs of the at least one PTA;
receiving a result of the regression testing from at least some of the ISVs;
updating, via a test server of the software provider, a first count for each of the ISVs providing a result indication of successful regression testing of the at least one PTA with regard to the update to the software platform and updating a second count for each of the ISVs providing a result indication of unsuccessful regression testing of the at least one PTA with regard to the update to the software platform; and
committing the update to the software platform if the first count exceeds a first threshold.

2. The method of claim 1, further comprising enabling distributed regression testing of the update to the software platform to be performed via the update notification.

3. The method of claim 2, further comprising storing failure report information from the distributed regression testing associated with at least one PTA in a failure log.

4. The method of claim 1, further comprising not committing the update to the software platform if the first count does not exceed the first threshold.

5. The method of claim 1, further comprising sending the update notification to a first ISV of a first PTA responsive to a receipt of a registration message from the first ISV for the first PTA.

6. The method of claim 5, further comprising inserting an entry in a notification log responsive to the registration message.

7. The method of claim 1, further comprising performing vendor-specific regression testing of the updated software platform prior to sending the update notification.

8. The method of claim 7, further comprising tentatively committing the update to the software platform if the updated software platform passes the vendor-specific regression testing.

9. The method of claim 1, wherein the software platform comprises a platform application programming interface (API).

10. The method of claim 1, wherein the software platform comprises a cloud computing platform, the plurality of ISVs are unaffiliated software providers for the cloud computing platform, and code of the regression testing of each of the plurality of ISVs remains private to the corresponding ISV and only non-identifying information is provided to the software provider.

11. A system comprising:
a platform server including a software platform on which a plurality of platform targeting applications (PTAs) of a plurality of independent software vendors (ISVs) execute;
an update server coupled to the platform server to provide an update to the software platform;
a notification server to send an update notification to inform the plurality of ISVs of an update to the software platform; and
a test server to receive a result of regression testing performed on at least some of the plurality of PTAs executing on the updated software platform from at least some of the ISVs and to commit the update to the software platform based on at least some of the ISV results.

12. The system of claim 11, wherein the test server includes a first logic to maintain a first count of a number of the PTAs that pass regression testing on the updated software platform and a second count of a number of the PTAs that fail regression testing on the updated software platform.

13. The system of claim 12, wherein the test server includes an update commitment logic to commit the software platform update based on at least the first count.

14. The system of claim 11, wherein the test server includes a failure analysis logic to analyze the regression test result for at least one of the ISVs to determine a location within the updated software platform at which a corresponding PTA failed the regression testing.

15. The system of claim 11, further comprising a storage area network (SAN) coupled to the test server and including a notification database to store a list of ISVs to be notified responsive to the update to the software platform and a report queue to store test results received from at least some of the ISVs.

16. An article comprising a machine-accessible storage medium including instructions that when executed cause a system to:
send an update notification to a plurality of independent software vendors (ISVs) each associated with at least one platform targeting application (PTA) to execute on a cloud computing platform of a data center, the update notification to indicate occurrence of an update to the cloud computing platform and to trigger execution of regression testing by the plurality of ISVs of the at least one PTA;
receive a result of the regression testing from at least some of the ISVs; and commit the update to the cloud computing platform if a plurality of first tier PTAs of the ISVs passes regression testing of the corresponding first tier PTA executing on the updated cloud computing platform.

17. The article of claim 16, further comprising instructions that when executed enable the system to commit the update to the cloud computing platform if a count of second tier PTAs of the ISVs passing the regression testing exceeds a first threshold.

18. The article of claim 17, further comprising instructions that when executed enable the system to commit the update to the cloud computing platform if a count of third tier PTAs of the ISVs passing the regression testing exceeds a second threshold, and otherwise to not commit the cloud computing platform.

19. The article of claim 17, wherein the first tier PTAs have a higher criticality than the second tier PTAs.

20. The article of claim 16, further comprising instructions that when executed enable the system to not commit the update to the cloud computing platform if any of the first tier PTAs do not pass the regression testing.

* * * * *